United States Patent [19]
Murata et al.

[11] 3,948,777
[45] Apr. 6, 1976

[54] SOLUTION SEPARATING AND RECOVERING EQUIPMENT

[75] Inventors: Kazuo Murata; Katsuzi Ashida, both of Takatsuki, Japan

[73] Assignee: Yuasa Battery Company Limited, Japan

[22] Filed: Sept. 16, 1974

[21] Appl. No.: 505,961

[52] U.S. Cl. ............................................. 210/321 R
[51] Int. Cl.² ........................................... B01D 31/00
[58] Field of Search ............ 210/22, 321, 493, 494, 210/541

[56] References Cited
UNITED STATES PATENTS

| | | | |
|---|---|---|---|
| 3,219,573 | 11/1965 | Chen et al. | 210/321 X |
| 3,256,174 | 6/1966 | Chen et al. | 210/321 X |
| 3,370,710 | 2/1968 | Bluemle, Jr. | 210/321 |
| 3,442,388 | 5/1969 | Pall | 210/321 |
| 3,695,445 | 10/1972 | Esmond | 210/321 |
| 3,703,466 | 11/1972 | Laforest et al. | 210/321 |
| 3,757,955 | 9/1973 | Leonard | 210/321 |
| 3,780,870 | 12/1973 | Esmond | 210/321 |
| 3,823,827 | 7/1974 | Radford | 210/493 |

*Primary Examiner*—Theodore A. Granger
*Attorney, Agent, or Firm*—Watson, Cole, Grindle, & Watson

[57] ABSTRACT

This invention relates to a solution separating and recovering equipment:

The equipment is formed by overlapping one or more sets of plates each of which includes a separating plate having a separation module or separating element therein which is formed by zigzag bending and laminating a flat microporous membrane, a solution guide plate and a permeate guide plate.

8 Claims, 13 Drawing Figures

SOLUTION SEPARATING AND RECOVERING EQUIPMENT

The present invention is a solution separating and recovering equipment which provides favorable in performance and long life and may be produced inexpensively.

This invention relates to solution separating and recovering equipment and more particularly to an equipment for separating and recovering a specific component from a substance of two or more components contained in a liquid.

The membrane used conventionally for ultrafiltration or the like has numerous micropores of a diameter of less than 10 microns and is made in the form of a sheet or tube. There have been defects in the material that it is comparatively so low in mechanical strength that it breaks during use. Also, as the membrane area per unit volume can not be made larger, its permeating efficiency is low.

The present invention overcomes all of these defects.

The first object of the present invention is to provide a solution separating and recovering equipment having greatly improved performance.

The second object of the present invention is to provide a solution separating and recovering equipment having a long useful life.

The third object of the present invention is to provide a solution separating and recovering equipment which is easy to operate and which is inexpensive.

The objects of the present invention can be easily understood by referring to the following description and the accompanying drawing in which.

Figure 1:
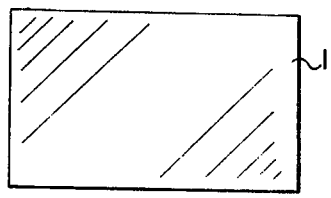
FIG. 1 is a plan view of a microporous membrane of the present invention.

In FIG. 1, the reference numeral 1 refers to a microporous membrane having many micropores of a diameter ranging from 10A to 10 microns and which is made of cellulose or a synthetic resin.

Figure 2:
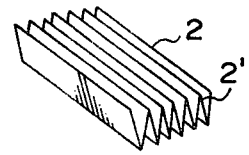
FIG. 2 is a perspective view of a separation module formed of the microporous membrane shown in FIG. 1.
Figure 3:
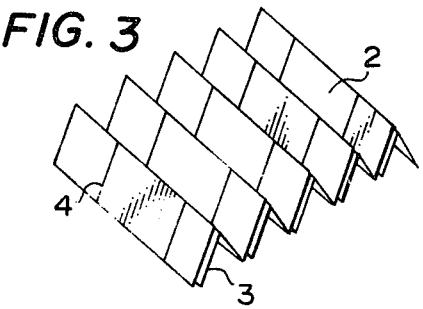
FIG. 3 is a perspective view of another modification of the separation module.

In FIG. 2, the reference numeral 2 refers to a separation module made by zigzag bending and laminating the microporous membrane 1 shown in FIG. 1 and compressing it in the laminating direction. When the microporous membrane is bent in the zigzag form, a plurality of channels 2' are formed which act as passages for the solution. Further, as shown in FIG. 3, the separation module can be formed by lapping a porous body 3 of a woven fabric or nonwoven fabric made of synthetic resin fibers over the microporous membrane 1. It has advantages of increasing the mechanical strength and smoothly guiding the permeate. For example, a separation module 2 of a height of 2.5cm., length of 20cm., and width of 20cm., is formed by lapping a porous body consisting of a screen of 50 meshes of a thickness of 0.35mm., made of synthetic resin fibers over a microporous membrane of a thickness of 0.1mm., and an average micropore diameter of 0.4 micron made of synthetic resin, bending and laminating them and compressing them in the laminating direction under a pressure of 1 kg./cm$_2$. If the above described bent parts are further reinforced by filling the micropores by treating them with heat, resin or solvent, a separation module high in mechanical strength and noncollapsing in form is obtainable. If the microporous membrane 1 is provided with ribs 4 and is bent as shown in FIG. 3, a proper clearance is maintained between the adjacent microporous membranes and the resistance to the flow of the solution following along the microporous membrane 1 is able to be reduced.

Figure 4:
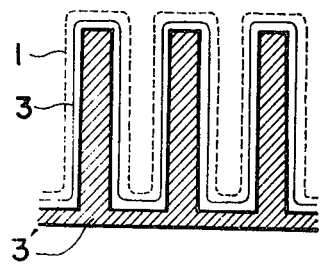
FIG. 4 is a cross-sectional view of a part of still another modification of the separation module.
Figure 5:
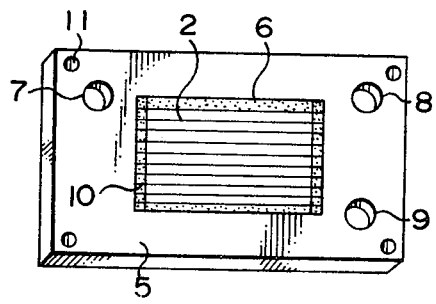
FIG. 5 is a perspective view of a separating plate having the separation module mounted therein.

As shown in FIG. 4, in order to prevent the separation module from being deformed, a support member 3', the shape of which is conformed to the separation module, may be arranged on the permeate side of the separation module. The support member may be either preformed or formed by depositing powder of synthetic resin or the like in the passage of the separation module and then sintering or curing the powder so as to provide a microporous support member which serves to collect the permeate together with supporting the separation module. In forming the support member glass beads may be used in place of the synthetic resin powder. The thus obtained separation module 2 is fitted with a binder 10 to an opening 6 of a separating plate 5 made of synthetic resin. The separating plate 5 is provided with solution passages 7 and 9, a permeate passage 8 and a required number of bolt holes 11 as shown in FIG. 4.

Figure 6:
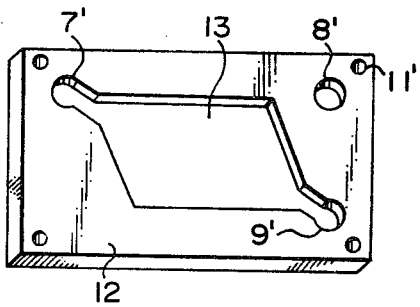
FIG. 6 is a perspective view of a solution guide plate.

FIG. 6 shows a solution guide plate 12 having an opening 13 of a required shape, a permeate passage 8' and a required number of bolt holes 11', having the same dimensions as of the separating plate 5 and made of semihard rubber. The opening 13 is provided with passages 7' and 9' communicating respectively with the solution passages 7 and 9 in the separating plate 5.

Figure 7:
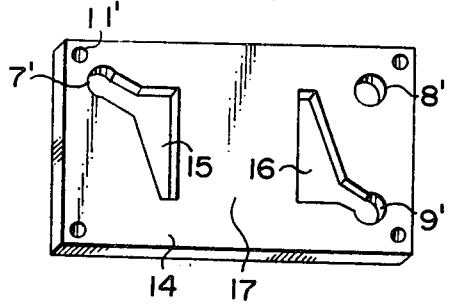
FIG. 7 is a perspective view of another modification of the solution guide plate.

FIG. 7 shows another modified solution guide plate 14 having openings 15 and 16 of required shapes, a permeate passage 8' and a required number of bolt holes 11', having the same dimensions as of the separating plate 5 and made of semihard rubber.

The opening 15 is provided with a passage 7' communicating with the solution passage 7 in the separating plate 5. The opening 16 is provided with a passage 9' communicating with the solution passage 9 in the separating plate 5.

The solution guide plate 12 or 14 is fitted in contact with one side of the separating plate 5. For example, if the solution guide plate 14 is fitted into contact with the separating plate 5, the openings 15 and 16 form flow passages for the solution and the intermediate unopened part 17 is in contact with the respective tops of the folds of the microporous membrane thereby forming a plurality of parallel triangularly shaped channels for the solution.

Figure 8:
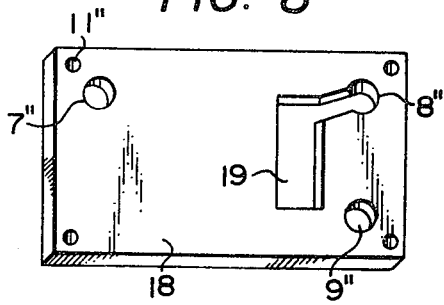
FIG. 8 is a perspective view of a permeate guide plate.

A permeate guide plate 18 is fitted into contact with the other side of the operating plate 5 from the solution guide plate 12 or 14. As shown in FIG. 8, said permeate guide plate 18 is of the same dimensions as the separating plate 5, is made of semihard rubber and has an opening 19 therein of a required shape, a pair of solution passages 7″ and 9″ which mate with the solution passages 7 and 9 respectively in the separating plate 5, and a required number of bolt holes 11″. The opening 19 is provided with a passage 8″ communicating with the permeate passage 8 in the separating plate 5.

Figure 9:
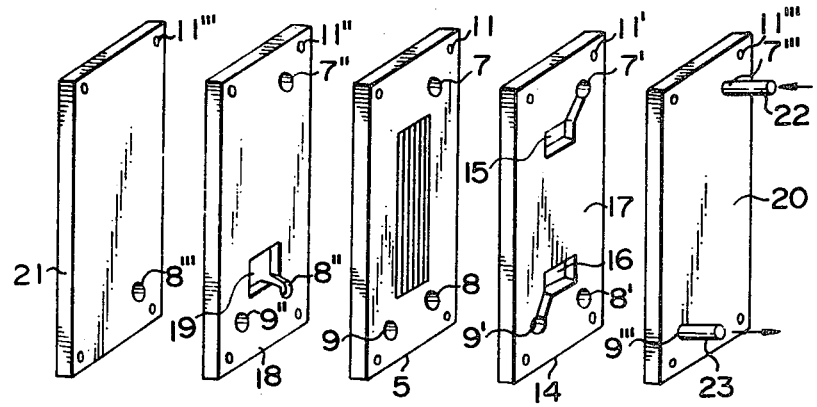
FIG. 9 is an exploded perspective view showing an arrangement of the separating plate, solution guide plate, permeate guide plate and side plates before a solution separating and recovering equipment according to the present invention is assembled.
Figure 10:
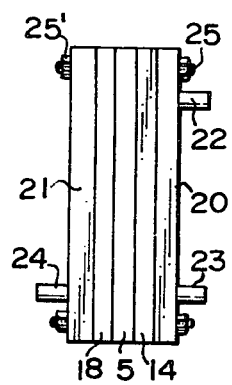
FIG. 10 is a side view of the solution separating and recovering equipment of the present invention.
Figure 11:
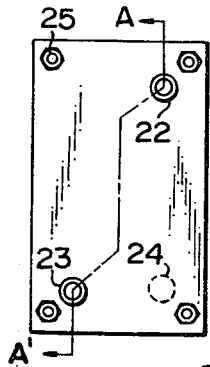
FIG. 11 is an elevation view of the solution separating and recovering equipment of the present invention.
Figure 12:
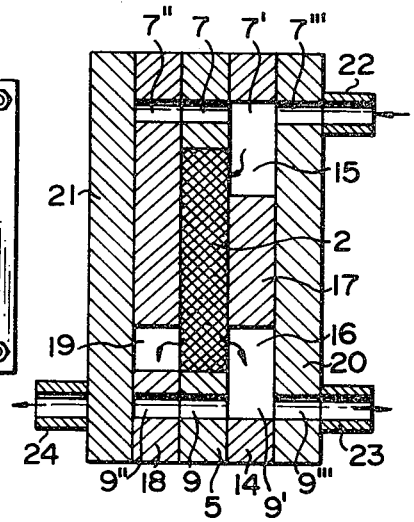
FIG. 12 is a magnified vertically cross-sectional view of the solution separating and recovering equipment taken along the line A—A' in FIG. 9.

In FIG. 9, side plates 20 and 21 are shown outside of the described separating plate 5, the solution guide plate 14 (or 12) and permeate guide plate 18. The side plate 20 has a passage 7‴, a solution inlet 22 communicating with it, a passage 9‴, a solution outlet 22 communicating with it, and a required number of bolt holes 11‴. The side plate 21 has a passage 8‴, a permeate outlet 24 communicating with it, and a required number of bolt holes 11‴. The side plate 20, solution guide plate 14, separating plate 5, permeate guide plate 18 and side plate 21 after being aligned as shown in FIG. 9 are integrally assembled with bolts 25 and nuts 25′ and are shown in FIGS. 10, 11 and 12. In FIG. 12, as shown by the arrows, a solution containing a substance of two or more components comes in through the solution inlet 22, reaches the separation module 2 through the passage 7‴ in the side plate 20 and the passage 7′ and opening 15 in the solution guide plate 14 and further passes through the channels 2′ of the separation module 2. In such case, the solution will flow along the microporous membrane 1 and will be discharged through the solution outlet 23 through the opening 16 and passage 9′ in the solution guide plate 14 and the passage 9‴ in the side plate 20 while a permeate containing a specific component is transferred to the other side of the microporous membrane 1. There, the permeate is discharged through the permeate outlet 24 through the opening 19 and passage 8″ in the permeate guide plate 18 and the passage 8‴ in the side plate 21.

FIGS. 9, 10, 11 and 12 show a simple embodiment of the solution separating and recovering equipment of the present invention. However, if a required number of sets of the permeate guide plate, separating plate and solution guide plate are arranged in the order mentioned after which a pair of side plates are finally fitted into contact with both sides and all are integrally assembled with bolts and nuts, a solution separating and recovering equipment having a plurality of parallel separating plates may be obtained.

Figure 13:
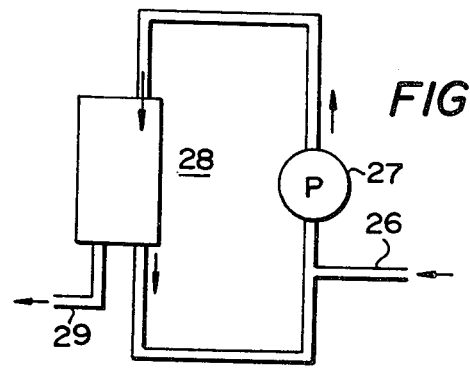
FIG. 13 is a flow chart of a separation system in which the solution separating and recovering equipment of the present invention is arranged.

FIG. 13 is a flow diagram showing an example of a separation system provided with the equipment of the present invention. Reference numeral 26 is a solution inlet pipe, 27 is a circulating pump, 28 is the solution separating and recovering equipment of the present invention, and 29 is a permeate outlet pipe. The solution is circulated and fed into the soluton separating and recovering equipment and a permeate containing a specific component of that solution is moved through the microporous membrane from the solution by means of the equipment and is discharged.

As already discribed, the solution separating and recovering equipment of the present invention is formed of a separation module formed by zigzag bending and laminating a microporous membrane. Therefore, the apparent surface area is larger than of a flat microporous membrane and a microporous membrane 10 to 20 times as large can be contained per unit volume.

Thus the solution separating and recovering equipment of the present invention can be applied to ultrafiltration. In such case, it is proper that the linear velocity of the solution is 3m./sec., the pressure is about 3 atmospheres and the micropore diameter of the microporous membrane is less than 1 micron. It can be applied also to a reverse permeation equipment. In such case, it is desirable that the linear velocity is 1m./sec., the pressure is more than 10 atmospheres and the micropore diameter of the microporous membrane is less than 1 micron. Further, the equipment of the present invention can be applied to such a wide range of uses as the separation of a high molecular weight component and a low molecular weight component in a solution from each other, desalination of a solution, separation, recovery and refinement of any solution and concentration of a food or medicine. The microporous membrane can be washed reversely on the permeate side by applying a high pressure from the solution side at proper intervals. Further, if the equipment of the present invention is provided with a passage for the reflux of the permeate, the permeate will be able to be circulated. For example, it can be applied as an artificial kidney. Even if the amount of blood entering the equipment of the present invention is small, it will be able to contact the microporous membrane of a large apparent surface area and the dialyzing efficiency will be very high.

Needless to say, it is evident that various modifications of the present invention are possible without being limited in scope to the already described embodiment and without deviating from the spirit of the invention. For example, the separating plate, solution guide plate and permeate guide plate are all formed of flat plates. However, they can be formed also as concentric cartridges.

What is claimed is:

1. A solution separating and recovering equipment comprising at least one set of associated plates comprising a separating plate having a central opening therein in which a solution separating module is mounted so as to prevent flow through the opening without passing through the module, the separating module including a normally flat microporous membrane which is repeatedly bent in a zigzag manner along regularly and closely spaced parallel lines and compressed in a direction normal to the lines so as to form a plurality of essentially identical, parallel, V-shaped channels for guiding the flow of solution across the separating module, a solution guide plate sealably fitted to one side of the separating plate, the solution guide plate having an inlet opening therethrough which communicates with one end of each of the plurality of channels and having a central portion which overlies a major portion of the channels and renders the channels triangular in cross-section, and a permeate guide plate sealably fitted to the other side of the separating plate, the permeate guide having an outlet opening therethrough which communicates with the channels in the separating module on the permeate side for removing the permeate, and a pair of side plates fitted to the other sides of the solution guide plate and the permeate guide plate and having means therein for transferring the respective fluid therethrough to the juxtaposed guide plate.

2. A solution separating and recovering equipment according to claim 1, wherein the separation module further includes a porous body lapped against the microporous membrane to increase its mechanical strength.

3. A solution separating and recovering equipment according to claim 2, wherein there is further included a support member which conforms to the separating module at the permeate side.

4. A solution separating and recovering equipment according to claim 3, wherein the support member is a cured microporous material formed of a synthetic resin.

5. A solution separating and recovering equipment according to claim 1, wherein the separation module further includes means interposed in a portion of each of the channels for reinforcing the microporous membrane.

6. A solution separating and recovering equipment according to claim 5, wherein the reinforcing means comprises a cured resin.

7. A solution separating and recovering equipment according to claim 6, wherein the reinforcing means comprises a plurality of glass beads.

8. A solution separating and recovering equipment according to claim 1, wherein the solution guide plate and the permeate guide plate are each formed of a semihard rubber.

* * * * *